(No Model.)
J. GATES.
CAR COUPLING.
No. 513,677.  Patented Jan. 30, 1894.
Fig. 1.
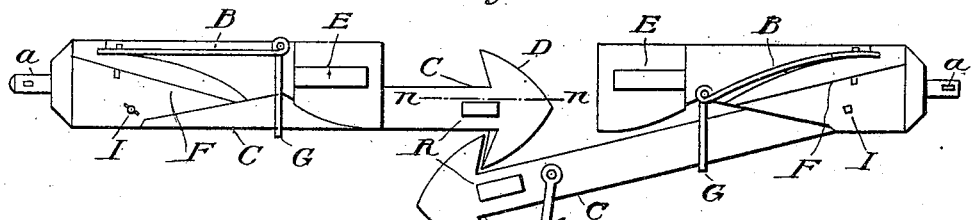
Fig. 2.  Fig. 3.
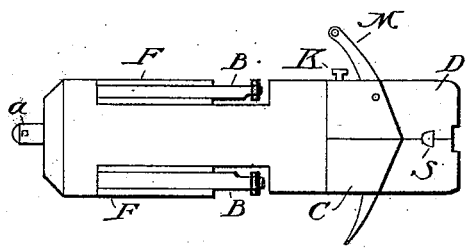 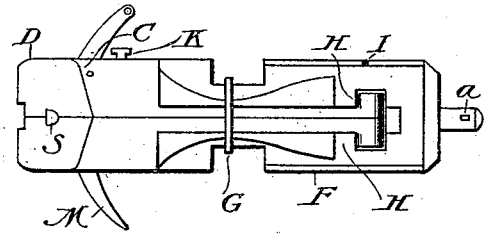
Fig. 4.  Fig. 5.
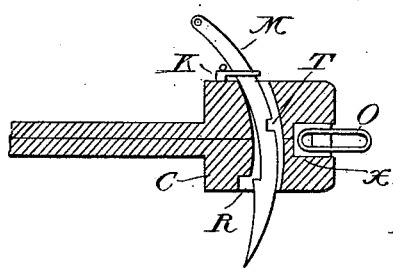
Fig. 6.
Fig. 7.  Fig. 8.
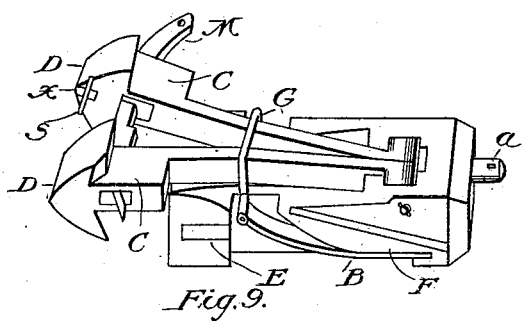
Fig. 9.
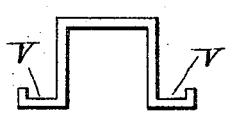 
Witnesses:  Inventor:
  James Gates
  per W B Jackson
  Attorney
THE NATIONAL LITHOGRAPHING COMPANY
WASHINGTON, D. C.

UNITED STATES PATENT OFFICE.

JAMES GATES, OF SOMBRA, CANADA, ASSIGNOR OF ONE-HALF TO GEORGE REID, OF SAME PLACE, AND THOMAS ELLIOTT, OF GOODRICH, CANADA.

CAR-COUPLING.

SPECIFICATION forming part of Letters Patent No. 513,677, dated January 30, 1894.

Application filed March 1, 1893. Serial No. 464,283. (No model.)

*To all whom it may concern:*

Be it known that I, JAMES GATES, farmer, a subject of the Queen of Great Britain and Ireland, residing in the township of Sombra, in the county of Lambton and Province of Ontario, Canada, have invented a new and useful Railroad-Car Coupler, of which the following is a specification.

My invention relates to improvements in machines for coupling railroad cars automatically. I attain this object by the mechanism illustrated in the accompanying drawings in which—

Figure 1. is a side elevation of two machines embodying my invention, Fig. 2 is a plan of the same. Fig. 3 is a view of the bottom of a machine embodying my invention. Fig. 4 is a sectional view of a machine embodying my invention on the line "N"—"N" in Fig. 1. showing the operating lever and the old style link and pin attachment for use in coupling a car equipped with a machine of my invention with a car having the old style link and pin coupling. Fig. 5 is a plan of the bumper or stationary part of my coupler having through its rear end the bolt "A" for attaching the bumper to the car and having on its sides grooves "E" "E" for the reception of the car timbers which grooves are made sufficiently long to allow the bumper easy play backward and forward. Fig. 6 is a view of the bottom of a machine embodying my invention showing the drawbars separated as they would be in the operation of uncoupling two cars equipped with machines of my invention. Fig. 7. is a coupling pin for use in coupling a car equipped with a machine of my invention with a car having the old style link and pin coupling. Fig. 8 is a metal loop or clevis to be attached to the springs "B" "B" for the purpose of raising and holding the drawbars of my machine in position. Fig. 9. is a bolt or head for attaching a machine embodying my invention to the body of the car.

In the drawings "A" represents the bolt or head by which the coupling apparatus is attached to the car.

"B" "B" are the springs which in connection with the loop or clevis "G" raise and hold in position the double draw-bars "C" "C" which draw-bars "C" "C" are made of spring steel or other suitable material and have solid or cast metal heads "D" "D" the front ends of which are made wedge-shaped and having hooks on both the upper and lower sides, the hooks on the upper side being so formed that when they are lying side by side the surfaces next the body of the car will be in form similar to the letter V the point of which shall be farthest from the car and on the lower side the hooks are so formed that when lying side by side their inner surfaces will form an inverted V the apex or point of which shall be toward the car. Such spring draw-bars "C" "C" have the inner ends upset or made thicker than the other parts, to come in contact with shoulders "H" "H" formed on the bumper to receive them, the drawbars being held in place by a bolt "I" passing through the bumper and through them the thick or upset end and by the clevis or loop "G" in connection with the springs "B" "B."

The springs "B." "B." are fastened to the bumper by ordinary bolts and are bent, when in operation over the bridges "F" "F." formed on the sides of the bumper thus equalizing the strain upon the springs throughout their full length.

Passing through slots in the double draw-bars "C" "C" as appears in Fig. 4 is an operating lever "M" having a dog or shoulder "R" formed thereon to come in contact with a receptacle or recess formed therefor on one of the draw-bars "C" thus holding the draw-bars "C" "C" together. This lever is held or pressed to a position to hold the drawbars together by a suitable spring of metal or rubber inserted at the place marked T in Fig. 4.

The draw-bars "C" "C" when in their normal condition lie in a groove on the under side of the bumper made of a size to fit them snugly, which groove is made much wider at the bottom of the bumper with a gradual slope from the top to the bottom of the groove to enable the spring draw-bars "C" "C" to be spread apart when deflected.

"K" is a hook or dog attached by a bolt to the side of the bumper for the purpose of holding the lever "M" so that the shoulder or dog "R" shall not catch on the receptacle provided for it on the draw-bar "C."

O is one of the old style links and X is a draw-pin having one side made flat as in Fig. 7 so that the strain shall be equally upon the two drawbars "C" "C" when a car equipped with a machine of my invention is coupled to one of the old style.

My machine operates as follows: When the cars come together the heads of the drawbars "D" "D" strike and both being wedge-shaped (difference in the height of the cars being immaterial) one pair will slide under the other when the upper pair of heads will strike the end of the bumper on the other car and the pair which have been deflected will be raised by the springs "B" "B" operating with the clevis or loop "G" until the hooks on the ends of the drawbars hereinbefore described will interlock as is shown in Fig. 1 thus completing the coupling. When it is desired to uncouple the cars the lever "M" is moved so that the dog at "R" lets go its hold on the drawbar "C" as is shown in Fig. 4 when the two lower draw bars "C" "C" being out of the groove in the under side of the bumper will be forced apart by the strain or pressure of the pair of hooks on the lower side of the upper pair of drawbars "C" "C" thus allowing the upper pair of draw heads "D" "D" to slip between the lower pair and thereby uncoupling the cars and as soon as the uncoupling is complete the lower or deflected pair of drawbars immediately resume their normal position. For shunting purposes the lever "M" can be fastened back by the hook or dog "K" so that it will not hold the drawbars "C" "C" together thus enabling a whole train to be moved backward without coupling.

With cars equipped with machines of my invention the necessity of men going between the cars for the purpose of coupling or uncoupling them is entirely done away with as the operation of coupling is performed automatically and the lever "M" is made sufficiently long that it may be reached from the side of the car or it may be operated by a bar or rope from the top of the car. Another feature of my machine is that in case of accident or necessity cars equipped with my machines can be instantly uncoupled no matter what may be the speed of the train.

What I claim as my invention, and desire to secure by Letters Patent, is—

1. In a car coupler the combination of the spring draw bars "C" "C" having the form hereinbefore described with the lever "M" substantially as and for the purpose hereinbefore set forth.

2. The combination of the springs B. B. and the clevis "G" and the bumper with the spring draw-bars "C" "C" substantially as and for the purpose hereinbefore set forth.

Wallaceburg, Ontario, February 11, 1893.

JAMES ╳ GATES.
his mark

Witnesses:
C. B. JACKSON,
JAMES BUTLER.